United States Patent [19]

Elander

[11] 4,238,048

[45] Dec. 9, 1980

[54] PLUG SEAL

[75] Inventor: Jay C. Elander, Wayzata, Minn.

[73] Assignee: Honeywell Inc., Minneapolis, Minn.

[21] Appl. No.: 70,281

[22] Filed: Aug. 27, 1979

[51] Int. Cl.³ .......................................... B65D 39/00
[52] U.S. Cl. ............................ 220/307; 220/DIG. 19
[58] Field of Search ...................... 220/307, DIG. 19; 138/89

[56] References Cited
U.S. PATENT DOCUMENTS 2,670,871  3/1954  Spiess, Jr. et al. ................... 220/307

*Primary Examiner*—George T. Hall
*Attorney, Agent, or Firm*—Trevor B. Joike

[57] ABSTRACT

A plug seal for sealing a housing which has a hardness at least slightly less than the hardness of the plug seal is disclosed wherein the plug has a predetermined geometric shape and has first and second portions having corresponding first and second perimeters, the second perimeter being greater than the first perimeter, and the plug has a groove wherein as the plug is inserted into the housing the second portion of the plug will force a portion of the housing into the groove for providing a fluid tight fit.

14 Claims, 3 Drawing Figures

PLUG SEAL

BACKGROUND OF THE INVENTION

The present invention relates to a plug for sealing a housing and, more particularly, to a pressure plug for hydraulically sealing the housings of valves, actuators and the like.

In the construction of present day hydraulic devices such as servovalves for example, valve chambers are formed by machining a cylindrical valve chamber through the length of the valve housing and threading the chamber at either end. During assembly, therefore, a correspondingly threaded plug having an O-ring therearound is inserted into one end of the channel to provide a fluid tight seal. From the other end of the channel, a centering spring is inserted followed by the valve spool and a second centering spring. Then, the other end of the channel is sealed by a similarly threaded plug and O-ring assembly. As can be seen, the use of such a plug requires expensive threading of both the housing and the plug and requires a two part assembly of the plug and O-ring. The present invention, which is not limited to valves, such as that described above, eliminates the need for the threading operation on both the plug and the valve housing and eliminates the need for an O-ring seal.

SUMMARY OF THE INVENTION

A plug seal for sealing a housing having a hardness at least slightly less than the hardness of the plug seal comprises a plug with a predetermined geometric shape, the plug having first and second portions having corresponding first and second perimeters, the second perimeter being greater than the first perimeter, the plug having a groove and being of a material having a hardness wherein as the plug is inserted into the housing the second portion of the plug will force a portion of the housing into the groove.

BRIEF DESCRIPTION OF THE DRAWINGS

These and other features and advantages will become more apparent from a detailed consideration of the invention when taken in conjunction with the drawing in which.

DETAILED DESCRIPTION

Figure 1:
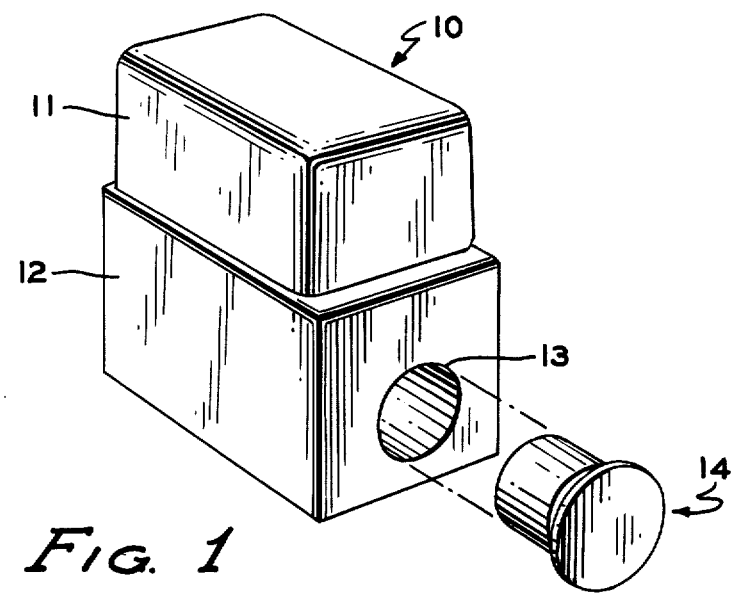
FIG. 1 is a perspective view showing the manner in which the plug according to the instant invention is inserted into a housing such as the valve shown therein.
Figure 3:
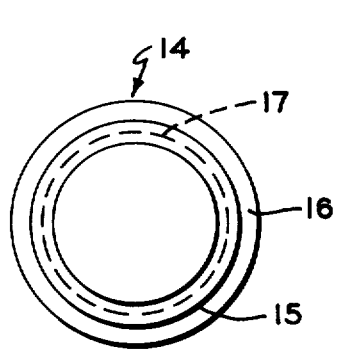

In FIG. 1, servovalve 10 may comprise an actuator 11 and a valve body or housing 12. Housing 12 may have a spool chamber 13 extending at least partially therethrough. During assembly, the centering springs and valve spool are inserted through opening 13. The plug seal 14 according to the present invention is finally pressed into the end of chamber 13 in valve 12 to seal the valve chamber.

Figure 2:
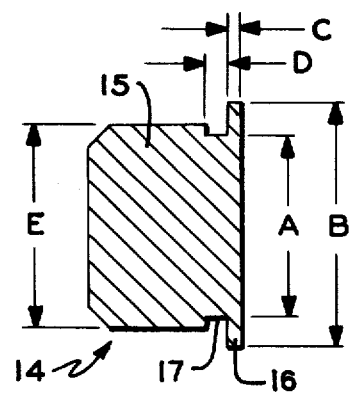
FIG. 2 is a cross sectional side view of the plug according to the present invention; and, FIG. 3 is an end view of the plug.

As shown in FIG. 2, plug 14 comprises first portion 15 and second portion 16. As can be seen from FIG. 2, the perimeter or circumference (where plug 14 is round) of first portion 15 is less than the perimeter or circumference of second portion 16. Although plug 14 may take any geometric shape, it is preferable for installation purposes that the geometric shape be circular.

Groove 17 separates first portion 15 from second portion 16. The perimeter or circumference of groove 17 is less than the perimeter or circumference of first portion 15. Although groove 17 may be located at any point on plug 14 so long as material from housing 12 is forced into groove 17 when plug 14 is pressed into aperture 13, groove 17 preferably separates first portion 15 from second portion 16 as shown in FIG. 2. When plug 14 is inserted or pressed into aperture 13 of valve housing 12, the flange or second portion 16 which is greater than the the diameter of aperture 13 will force a portion of valve housing 12 into groove 17 since the material of valve housing 12 is at least slightly less hard than the material of plug 14. Plug 14 may continue to be inserted into valve housing 12 until it is flush with housing 12. Once groove 17 is sufficiently filled with material from housing 12, plug 14 will provide a fluid tight seal of aperture 13.

Several dimensions are also shown on FIG. 2. Dimension A represents the diameter of groove 17, dimension B represents the diameter of second portion 16, dimension C represents the thickness of second portion 16, dimension D represents the width of groove 17, and dimension E represents the diameter of first portion 15. Although not required, it is preferable if these dimensions satisfy the following equation:

$$([B^2_{min} - E^2_{max}]/4)(\pi)(C_{min}) \geq ([(E_{max} + 0.004)^2 - A^2_{min}]/4)(\pi)(D_{max})$$

where the subscripts min and max are the minimum and maximum dimensions respectively of the tolerances for the designated dimensions. It is also preferable if the hole in the housing to which the plug is inserted be approximately 1 mil greater than dimension E of the plug.

The embodiments of the invention on which an exclusive property or right is claimed are defined as follows:

1. A plug seal for sealing a housing having a hardness at least slightly less than the hardness of the plug seal comprising a plug with a predetermined geometric shape, said plug having first and second portions having corresponding first and second perimeters, said second perimeter greater than said first perimeter, and said plug having a groove and being of a material having a hardness wherein as the plug is inserted into the housing, the first portion entering first, the second portion of the plug will force a portion of the housing into the groove.

2. The plug seal of claim 1 wherein said groove is located around said first portion of said plug and has a third perimeter less than said first perimeter.

3. The plug seal of claim 2 wherein said groove separates said first and second portions.

4. The plug seal of claim 1 wherein said plug is substantially cylindrical, said first perimeter is a first circumference around said first portion and said second perimeter is a second circumference around said second portion.

5. The plug seal of claim 4 wherein said groove is located around said first portion of said plug and has a third circumference less than said first circumference.

6. The plug seal of claim 5 wherein said groove separates said first and second portions.

7. The plug seal of claim 6 wherein said plug satisfies the equation:

$$([B^2_{min} - E^2_{max}]/4)(\pi)(C_{min}) \geq ([(E_{max} + 0.004)^2 - A^2_{min}]/4)(\pi)(D_{max})$$

where A is the diameter of the groove, B is the diameter of said second portion, C is the thickness of said second portion, D is the width of said groove, E is the diameter of said first portion, and the subscripts min and max are defined as the respective minimum and maximum dimensions of the tolerances for the dimensions A-E.

8. The plug seal of claim 1 wherein said plug is substantially metallic and has a hardness at least slightly greater than the hardness of the housing into which it is inserted.

9. The plug seal of claim 8 wherein said groove is located around said first portion of said plug and has a third perimeter less than said first perimeter.

10. The plug seal of claim 9 wherein said groove separates said first and second portions.

11. The plug seal of claim 8 wherein said plug is substantially cylindrical, said first perimeter is a first circumference around said first portion and said second perimeter is a second circumference around said second portion.

12. The plug seal of claim 11 wherein said groove is located around said first portion of said plug and has a third circumference less than said first circumference.

13. The plug seal of claim 12 wherein said groove separates said first and second portions.

14. The plug seal of claim 13 wherein said plug satisfies the equation:

$$([B^2_{min} - E^2_{max}]/4)(\pi)(C_{min})$$
$$([(E_{max} + 0.004)^2 - A_{min}]/4)(\pi)(D_{max})$$

where A is the diameter of the groove, B is the diameter of said second portion, C is the thickness of said second portion, D is the width of said groove, E is the diameter of said first portion, and the subscripts min and max are defined as the respective minimum and maximum dimensions of the tolerances for the dimensions A-E.

* * * * *